United States Patent [19]

Häberle et al.

[11] 4,303,267
[45] Dec. 1, 1981

[54] FASTENING ARRANGEMENT ON THE SIDE OF THE BODY OF A BUMPER AT THE FRAME OF A MOTOR VEHICLE

[75] Inventors: Fritz Häberle; Daniel Riechers, both of Sindelfingen; Richard Heusel, Tübingen, all of Fed. Rep. of Germany

[73] Assignee: Daimler-Benz Aktiengesellschaft, Stuttgart, Fed. Rep. of Germany

[21] Appl. No.: 896,380

[22] Filed: Apr. 14, 1978

[30] Foreign Application Priority Data

Apr. 16, 1977 [DE] Fed. Rep. of Germany ....... 2716887
Sep. 10, 1977 [DE] Fed. Rep. of Germany ....... 2740863

[51] Int. Cl.³ .............................................. B61F 19/04
[52] U.S. Cl. ....................................... 293/155; 403/7; 403/22; 403/361
[58] Field of Search ...................... 293/24, 25, 26, 30, 293/120, 126, 154, 155, 142; 403/7, 8, 22, 262, 361

[56] References Cited

U.S. PATENT DOCUMENTS

| 3,266,828 | 8/1966 | Baier .................................. 403/22 |
| 3,307,867 | 3/1967 | McGovern ........................ 293/126 |
| 3,608,943 | 9/1971 | Gostomski ..................... 293/155 X |
| 3,828,449 | 8/1974 | Miceli ............................ 293/102 X |
| 3,881,760 | 5/1975 | Hutai .................................. 293/99 |
| 3,972,551 | 8/1976 | Fannin ........................... 293/137 X |
| 4,079,975 | 3/1978 | Matsuzaki et al. ............. 293/155 X |

FOREIGN PATENT DOCUMENTS 363658 1/1932 United Kingdom ............... 293/154

Primary Examiner—Joseph F. Peters, Jr.
Assistant Examiner—D. W. Underwood
Attorney, Agent, or Firm—Craig and Antonelli

[57] ABSTRACT

A fastening arrangement for a bumper, especially for a bumper drawn down relatively far on the end of the body at the subframe of a motor vehicle, in which the bumper part to be fastened to the subframe is supported at a cross bearer connecting two vehicle longitudinal bearers with each other. Free ends of the bumper project into the associated longitudinal bearers; each of the free ends being also supported at the frame connection formed by the cross and longitudinal bearers.

18 Claims, 11 Drawing Figures

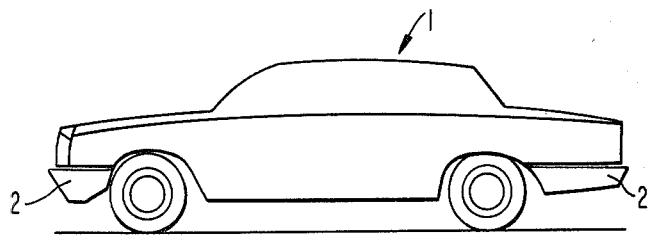
FIG 1
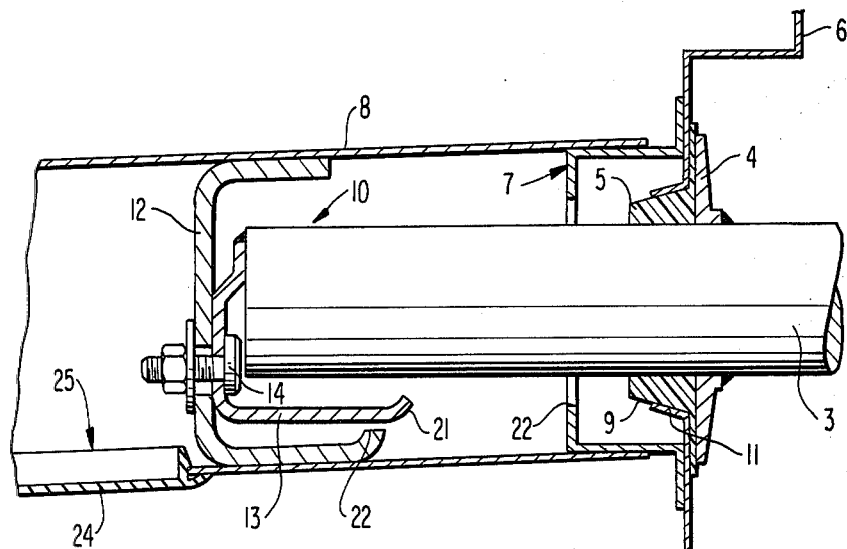
FIG 2
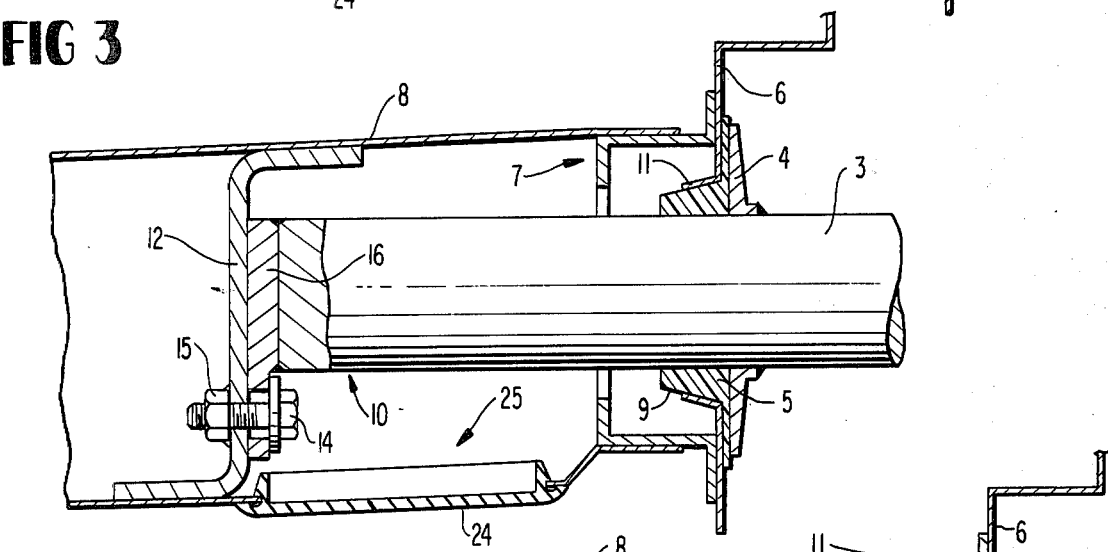
FIG 3
FIG 4
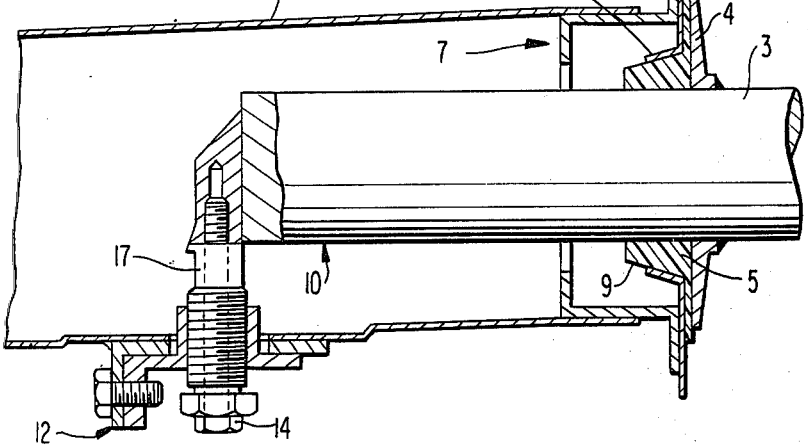

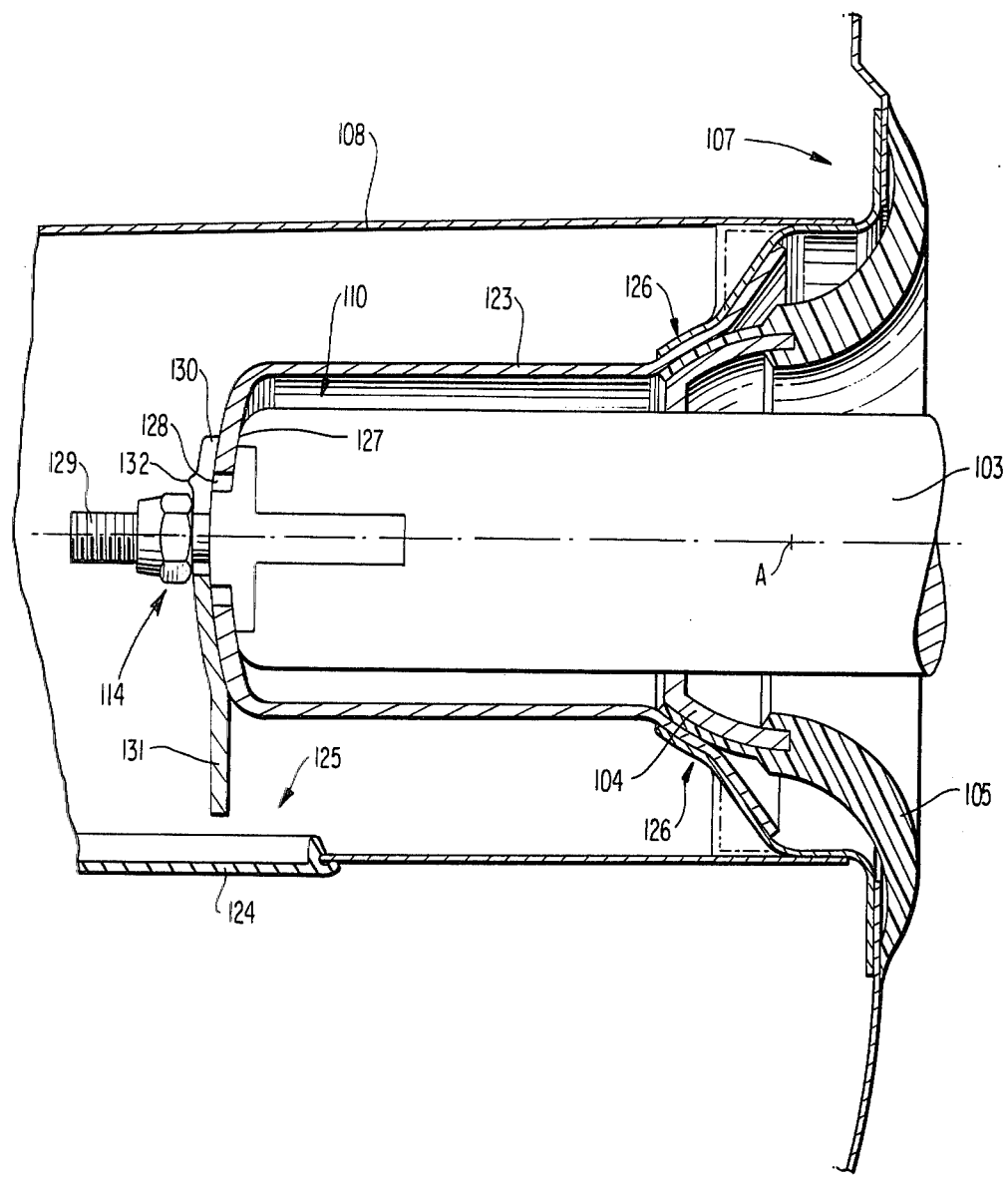

FASTENING ARRANGEMENT ON THE SIDE OF THE BODY OF A BUMPER AT THE FRAME OF A MOTOR VEHICLE

The present invention relates to a fastening arrangement for a bumper on the side of the body, especially of a bumper drawn down relatively far, at the substructure or subframe of a motor vehicle whereby the bumper part to be fastened is supported at a cross bearer connecting two vehicle longitudinal bearers with each other, the free ends of the bumper projecting into the coordinated longitudinal bearer.

Such a bumper fastening is disclosed in the German Offenlegungsschrift No. 2,307,330. The present-day customary bumpers frequently provided with energy-absorbing means represent structural parts having a relatively large weight, which in addition thereto frequently project far forwardly and/or rearwardly. In order to keep the vibration-behavior of such bumpers within permissive limits during the driving operation, the fastening thereof at the vehicle must take place very carefully. This requires frequently an additional, weight-increasing reinforcement of the cross bearer.

The alignment of such bumpers also involves difficulties during the installation thereof since even the smallest manufacturing inaccuracies become strongly noticeable and, for example, readily lead to an inclined position of the bumper.

It is therefore the aim of the present invention to provide a bumper fastening arrangement which eliminates the aforementioned disadvantages and which with simplest installation, leads to a positionally correct mounting and seating also in connection with bumpers that are drawn down relatively far.

Consequently, a fastening of a bumper, especially of a bumper extended down relatively far, at the substructure or subframe of a motor vehicle is proposed, whereby the bumper part to be fastened is supported at a cross bearer connecting two vehicle longitudinal bearers with each other, the free ends of said bumper projecting into the coordinated longitudinal bearer, and whereby according to the present invention, also the fee ends of the bumper part are supported at the frame connection formed by the cross bearer and longitudinal bearer.

In one embodiment of the present invention, the free end of the bumper part to be fastened may be detachably connected with a support bearer fixed with the longitudinal bearer.

A facilitation of assembly and installation can be achieved according to the present invention through the use of a curved bracket for receiving a fastening means which is secured at the free end of the bumper part.

In another embodiment of the present invention, the support bearer fixed with the longitudinal bearer includes a threaded portion which serves for receiving a fastening means, to which a plate non-detachably connected with the free end of the bumper part is adapted to be secured.

It is also possible that the support bearer fixed with the longitudinal bearer may serve as a support abutment, on which rests the free end of the bumper to be connected with the support.

Manufacturing tolerances can be readily compensated for if the support bearer fixed with the longitudinal bearer has a threaded bush for changing the support height.

A particularly easy access and fastening can be achieved through the use of a pivotal bracket-like support member arranged at the free end of the bumper part, whose arms point in the direction of the bumper part during the insertion of the bumper part into the longitudinal bearer and in that prior to the fastening of the pivotal support member at the support bearer its longer arm is pivoted downwardly and upon completed assembly and installation, its shorter arm or arms are supported at the bumper part.

It is of advantage if at least one of the arms of the support member has deflection edges which are deflected at coordinated guide surfaces in the interior of the longitudinal bearer during the insertion or removal operation of the bumper part. In addition to an unimpaired introduction and removal of the bumper part, an automatic transfer of the arms into a position favorable for assembly can be achieved simultaneously therewith.

In a further embodiment of the present invention, the free end of the bumper to be fastened is received by a sleeve which forms a component of the cross bearer.

According to a still further feature of the present invention, the longitudinal bearer is provided within the area of the fastening means with an opening adapted to be closed by a closure member.

A noise-free and sealed support of the bumper part at the cross bearer can be achieved without special fastening means, if the external support of the bumper part takes place with prestress at the sheet-metal closure member of the cross bearer under interposition of a sleeve of elastic material.

A self-centering action occurs if the sleeve is provided with a conical outer area which wedges into a funnel-shaped aperture of the cross bearer during the fastening of the free end of the bumper part.

Additionally, it is an aim of the present invention to provide a fastening arrangement which offers the possibility to compensate for manufacturing tolerances by simple means without the danger that the support of a flange fixedly connected with the bumper part suffers therefrom damage or misalignment.

Consequently, a fastening of a bumper is proposed in which the free end of the bumper part to be fastened is supported at the frame connection formed by a cross bearer and longitudinal bearer, whereby a sleeve operatively connected with the cross bearer serves for receiving the free end of the bumper part and has its bottom area provided with a through-aperture permitting universal displacement movements of the bumper part free end, such bumper part abutting thereat also being constructed spherically shaped, and whereby the external support of the bumper part which takes place under interposition of a sleeve of elastic material, also takes place at spherically shaped areas of the cross bearer and at a flange connected with the bumper part.

Accordingly, it is an object of the present invention to provide a fastening arrangement of a bumper at the subframe of a motor vehicle which avoids by simple means the aforementioned shortcomings and drawbacks encountered in the prior art.

Another object of the present invention resides in a fastening of a bumper at a substructure of a motor vehicle which permits a simple installation without unnecessarily increasing the weight.

A further object of the present invention resides in a bumper fastening at the substructure of a motor vehicle which keeps the vibrational behavior of the bumper within permissive limits while at the same time compensating readily for any manufacturing inaccuracies in the parts thereof.

A still further object of the present invention resides in a bumper fastening of the type described above which automatically leads to a correct seating of the bumper while at the same time facilitating its installation.

Another object of the present invention resides in a bumper fastening of the type described above which assures a noise-free and sealed support of the bumper part at the cross bearer without requiring special fastening means.

A further object of the present invention resides in a bumper fastening in a motor vehicle which automatically leads to a self-centering action in the course of the installation.

Still another object of the present invention resides in a fastening arrangement for a motor vehicle bumper, which not only permits compensation of larger manufacturing tolerances but additionally protects the parts against soiling.

These and other objects, features and advantages of the present invention will become more apparent from the following description when taken in connection with the accompanying drawing which shows, for purposes of illustration only, several embodiments in accordance with the present invention, and wherein:

FIG. 1 is a schematic side elevational view of a motor vehicle illustrating an arrangement in principle of a bumper which is drawn down relatively far;

FIGS. 2 and 3 are partial cross-sectional views through a longitudinal bearer end area with a cross bearer and illustrating two possible fastening arrangements in accordance with the present invention at a support bearer extending over the entire height of the longitudinal bearer;

FIGS. 4 and 5 are partial cross-sectional views through a longitudinal bearer end area and illustrating two further possibilities for bumper fastening arrangements in accordance with the present invention, in which a support bearer fixed with the longitudinal bearer serves as support for a bumper part to be attached;

Figure 9:
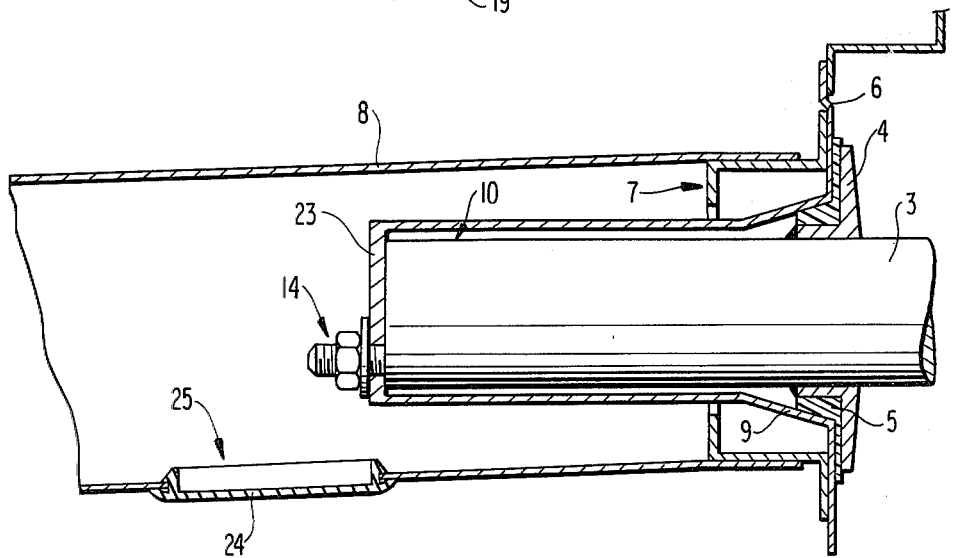
Figure 10:
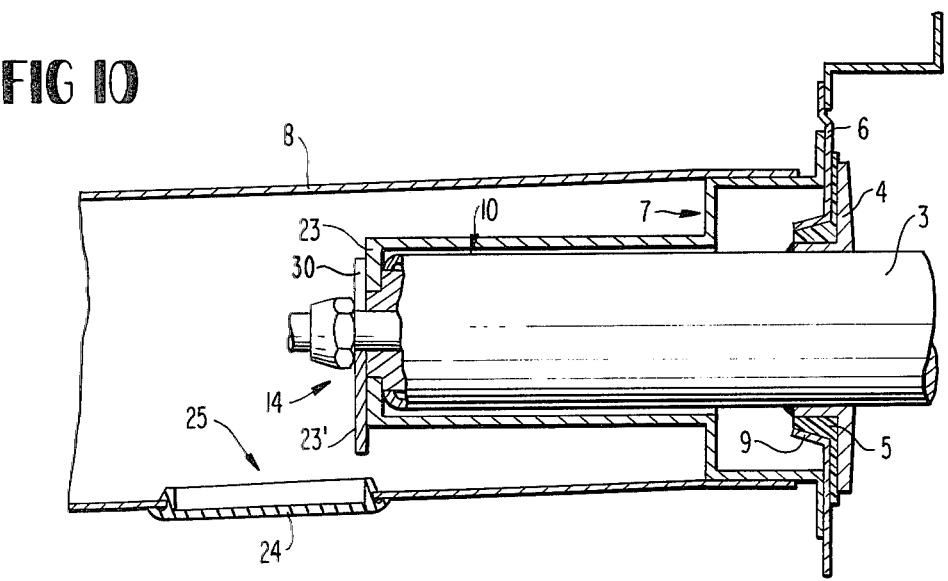

FIGS. 9 and 10 are partial cross-sectional views through two still further modified embodiments of a bumper fastening arrangement in accordance with the present invention utilizing a sleeve forming a component of the cross bearer; and FIG. 11 is a partial cross-sectional view through still another modified embodiment of a bumper fastening arrangement in accordance with the present invention which permits the compensation also of larger manufacturing tolerances.

Referring now to the drawing wherein like reference numerals are used throughout the various views to designate like parts and more particularly to FIG. 1, a motor vehicle generally designated by reference numeral 1 and merely schematically illustrated in this figure, is provided with bumpers 2 drawn down and about the vehicle relatively far which, for example, by reason of their structure or by reason of their support yield in the case of an impact under energy absorption and subsequently again regenerate. Such bumpers 2 can be installed—as heretofore generally customary—only with difficulties in the outer area of the motor vehicle 1 by reason of the poor accessibility.

In order to obviate this shortcoming, a bumper part 3 to be fastened to the subframe is supported in the embodiments according to FIGS. 2 to 7, 9 and 10 with prestress exclusively at the sheet-metal closure member 6 of a cross bearer generally designated by reference numeral 7 by way of a flange 4 securely connected with the bumper part 3, for example, welded thereto and under interposition of a sleeve 5 of elastic material. The cross bearer 7 connects with—in a manner not shown—two vehicle longitudinal bearers 8 and creates thereby a bearer connection. The sleeve 5 has a conical outer area 9 which, during the fastening of the free end 10 of the bumper part 3, is wedged into a funnel-shaped aperture 11 of the cross bearer 7.

The fastening of the bumper part 3, properly speaking, thus takes place by fixing the free end 10 thereof at the bearer connection formed by the cross bearer 7 and the longitudinal bearers 8. In the embodiments according to FIGS. 2 to 8, the longitudinal bearer 8 includes a support bearer 12 for the mounting of the free end 10, which support bearer according to FIGS. 2 and 3 extends over the entire height of the longitudinal bearer 8.

As shown in FIG. 2, the free end 10 may be provided with a curved bracket-like member 13 which receives a fastening means 14. Another type of fastening can be seen from FIG. 3. The support bearer 12 includes a threaded part 15 attached thereto so that with the aid of a fastening means 14, a plate 16 fixedly connected with the free end 10 of the bumper part 3 can be secured.

Figure 5:
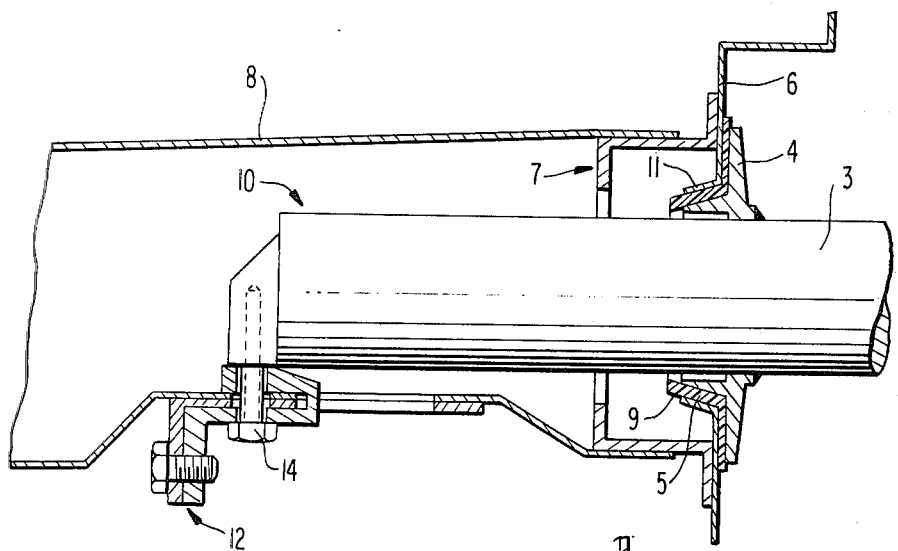

According to FIGS. 4 and 5, the support bearer 12 comprised of several parts serves as support for the free end 10. The support height can be readily changed for tolerance compensation by a threaded bush 17 in the support bearer 12 of the embodiment according to FIG. 4 which is adapted to be screwed in more or less to change the height of the support. In both embodiments of FIGS. 4 and 5, the fixing of the free end 10 takes place by way of at least one fastening means 14.

Figure 6:
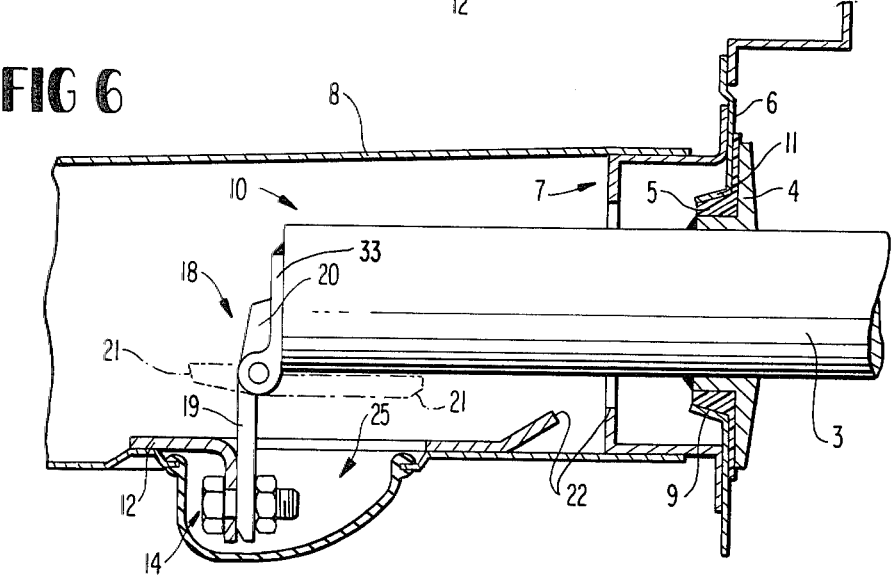
FIGS. 6 to 8 are partial cross-sectional views through three further modified embodiments of a bumper fastening arrangement in accordance with the present invention by means of pivotally arranged support members.
Figure 7:
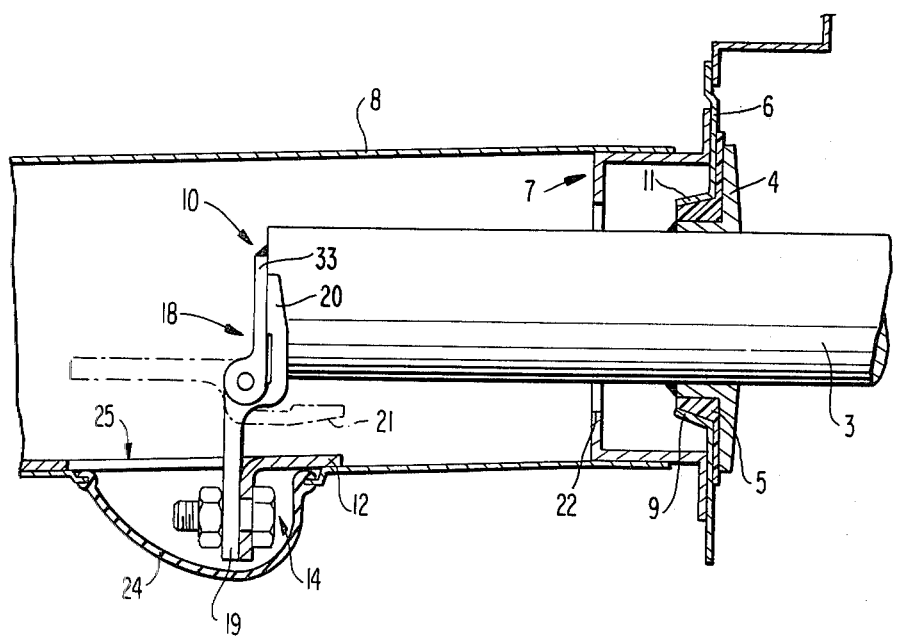
Figure 8:
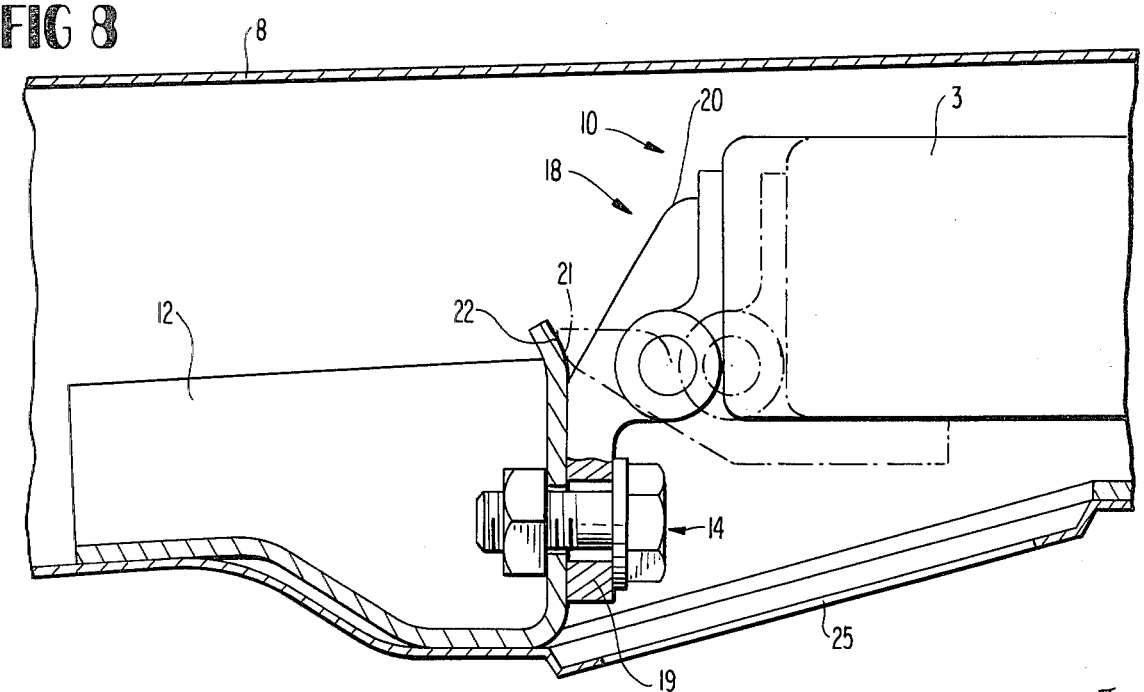

Another type of fastening of the free end 10 is illustrated in FIGS. 6 to 8. The free end 10 pivotally receives a bracket-like support member generally designated by reference numeral 18 whereby—as indicated in dash and dotted lines—the arms 19 and 20 thereof point during the insertion and removal operation in the axial direction of the bumper part 3. For purposes of attaching at the support bearer 12, the arm 19 which as a rule is longer, is pivoted downwardly through about 90° so that the two-armed support member 18 assumes the position illustrated in full lines, in which the shorter arm 20 thereof abuts against a plate 33 fixedly attached at the bumper part 3. It would, of course, also be possible especially in the embodiment according to FIG. 7 to subdivide the shorter arm 20 into two parts, i.e., fork-shaped, whereby one short arm abutable against plate 33 would be located on each side of the free end 10.

Deflection edges 21 which are deflected during the insertion and removal of the bumper part 3 at coordinated guide surfaces 22 on the inside of the longitudinal bearer 8 (FIGS. 3 and 6 to 8) facilitate the assembly and disassembly operation. The coordination of guide surfaces 22 and deflection edges 21 may thereby be made—as shown in FIG. 8—in such a manner that, for example, during the assembly operation, an automatic tilting of the support member 18 into the assembly position takes place.

A further type of fastening can be seen from FIGS. 9 and 10. In these two embodiments, the free end 10 of the bumper part 3 is received by a sleeve 23 which is a part of the cross bearer 7. Whereas in the embodiment according to FIG. 9, the fastening means 14 is installed only after the insertion of the bumper part 3, in the modified embodiment according to FIG. 10, the bumper part 3 together with the loosely mounted fastening means 14 is introduced and the fastening means 14 is subsequently clamped against an interposed and fork-shaped sheet-metal member 23' having a longitudinal slot 30 (not illustrated in detail).

In order that after completed assembly the interior of the longitudinal bearer 8 is protected against dirt and moisture, the different embodiments of the present invention include as a rule a closure member 24, by means of which an aperture 25 provided within the area of the fastening means 14 can be closed off.

Though in the embodiment of FIG. 4 the free end of the bumper part 3 is adjustable in height for tolerance compensation by means of a threaded bush or sleeve more or less screwed into a mounting flange, the fastening and adjusting arrangement thereof, which is disposed outside, can be protected only with difficulty against soiling and corrosion and has a relatively complicated construction. Additionally, the tolerance compensation is within relatively narrow limits, as otherwise the danger exists that the ring-shaped abutment of the flange fixedly connected with the bumper part at the associated sleeve 5 made of elastic material and supported at the cross bearer may be damaged thereby.

In the embodiment of FIG. 11, which is intended to provide for a larger height adjustment of relatively simple, protected construction and where like parts are designated by corresponding reference numerals of the 100 series, a bumper part 103 of a bumper of a motor vehicle otherwise constructed and arranged in any known manner not illustrated in detail herein, provided with a flange 104 suitably fixed thereto which is supported under interposition of a sleeve 105 of elastic material at an area 126 of a cross bearer generally designated by reference numeral 107. This cross bearer 107 connects with two vehicle longitudinal bearers 108, in a manner not shown in detail, which are provided with an aperture 125 adapted to be closed by a closure member 124 for reaching a fastening means 114 connecting the free end 110 of the bumper part 103 with a sleeve 123 attached to the cross bearer.

The bottom area 127 of the sleeve 123 is provided with an aperture 128 for a threaded pin 129 connected with the free end 110 of the bumper part 103, whereby the threaded pin 129 receives the fastening means 114. The fastening means 114 is supported at the end of the fastening operation against the outside of the bottom area 127 by way of a plate-like support member 131 provided with a longitudinal slot 130. The bottom area 127 and also the free end 110 abutting thereagainst are both constructed spherically curved. Also the flange 104 and the coordinated area 126 of the cross bearer 107 have such a construction so that the free end 110 can be pivoted about the indicated point "A." The pivot operation can be undertaken with a slightly loosened fastening means 114 and during the pulling of the free end 110 in the direction of the opening 125, a nose portion 132 of the plate-like member 131 serves as entrainment member.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A fastening arrangement for fastening a bumper on an end of a body at a superstructure of a motor vehicle, the bumper including bumper parts to be fastened at a cross bearer connected with vehicle longitudinal bearers, said bumper parts having free ends extending into said longitudinal bearers, characterized in that the cross bearer and longitudinal bearers form a frame connection, a sleeve means forming a component of said cross bearer is provided for supporting said bumper parts at the frame connection, means extending over an entire height of said longitudinal bearers are provided for fixedly supporting said free ends of the bumper parts at said longitudinal bearers, and in that means are provided for detachably connecting the free ends of the bumper parts to the supporting means including a curved member secured at each free end for receiving a fastening means for securing the curved member to its supporting means.

2. A fastening arrangement for fastening a bumper on an end of a body at a substructure of a motor vehicle, the bumper including bumper parts to be fastened at a cross bearer connected with the vehicle longitudinal bearers, said bumper parts having free ends extending into said longitudinal bearers, characterized in that the cross bearer and longitudinal bearers form a frame connection, a sleeve means forming a component of said cross bearer is provided for supporting said bumper parts at the frame connection, means extending over an entire height of said longitudinal bearers are provided for fixedly supporting said free ends of the bumper parts at the longitudinal bearers, means are provided for detachably connecting the free ends of the bumper parts to the supporting means including a plate-like member non-detachably connected with the free ends of each of said bumper parts, and in that the supporting means includes threaded portions for enabling a mounting of a fastening means for securing the plate-like members and free ends of said bumper parts to said support means.

3. A fastening arrangement for fastening a bumper on an end of a body at a substructure of a motor vehicle, said bumper including bumper parts to be fastened at a cross bearer connected with vehicle longitudinal bearers, said bumper parts having free ends extending into said longitudinal bearers, characterized in that the cross bearer and longitudinal bearers from a frame connection, a sleeve means forming a component of said cross bearer is provided for supporting said bumper parts at the frame connection, means are provided for supporting the free ends of the bumper parts at the longitudinal bearers, means are provided for detachably connecting the bumper parts with said supporting means, said supporting means are connectable to and serve as supports for the free ends of said bumper part, and in that said supporting means includes threaded bushing means operable to adjust a support height of the free ends of said bumper parts.

4. A fastening arrangement for fastening a bumper on an end of a body at a substructure of a motor vehicle, said bumper including bumper parts to be fastened at a cross bearer connected with vehicle longitudinal beares, said bumper parts having free ends extending into said longitudinal bearers characterized in that the cross bearer and longitudinal bearers form a frame connection, a sleeve means forming a component of said cross bearer is provided for supporting said bumper parts at the frame connection, means are provided for supporting the free ends of the bumper parts at the longitudinal bearers, means are provided for detachably connecting said bumper parts with said supporting means including a pivotal support member pivoted to each of the free ends of said bumper parts, each of the support members having a short support arm and a long support arm, said short and long support arms are capable of pointing substantially in an axial direction of the free ends of said bumper parts during an insertion of the free ends of said bumper parts into the longitudinal bearers, said longer support arms are capable of being pivoted downwardly prior to a fastening of the pivotal support member at the supporting means, and in that said shorter arms are supported at said bumper parts and said longer arms are connected to said supporting means by a fastening means upon a completed assembly.

5. A fastening arrangement according to claim 4, characterized in that said pivotal support member has fork-like shorter arms.

6. A fastening arrangement according to claim 4, characterized in that at least one of the support arms of said pivotal support member includes deflection edges which are deflected at coordinated guide surfaces on the inside of the longitudinal bearers during at least one of an insertion and a removal of the bumper part.

7. A fastening arrangement according to one of claim 1, 2, or 4, characterized in that the longitudinal bearers include apertures within an area of the fastening means, and in that closure members are provided for closing the respective apertures.

8. A fastening arrangement according to one of claims 1, 2 or 4, characterized in that the cross bearer includes a closure member having apertures therein for accommodating the free ends of the bumper parts, a flange is connected to said bumper parts, and in that the sleeve means is of an elastic material that is interposed between the flange and the aperture in the closure member.

9. A fastening arrangement according to claim 8, characterized in that said closure member is a sheet metal closure member.

10. A fastening arrangement according to claim 8, characterized in that the apertures in the closure member are funnel shaped, said sleeve means is provided with a conical area which, during a fastening of the free ends of said bumper part, wedges within the funnel-shaped apertures of the closure member.

11. A fastening arrangement for fastening a bumper on an end of a body at a substructure of a motor vehicle, said bumper including bumper parts to be fastened at a cross bearer connected with vehicle longitudinal bearers, said bumper parts having free ends extending into said longitudinal bearers, characterized in that the cross bearer and longitudinal bearers form a frame connection, sleeve means forming a component of the cross bearer is provided for supporting and mounting of the free ends of said bumper part at the frame connection, said sleeve means has a bottom area provided with a through-opening for permitting relative movement between said free ends and said bottom area, said bottom area and bumper part abutting thereagainst are spherically shaped, a spherically curved flange is connected to the bumper part, and in that said cross bearer includes a spherically curved area abutting against the spherically curved flange so as to provide additional external support of said bumper parts.

12. A fastening arrangement according to claim 11, characterized in that said external support further comprises the interposition of a sleeve of elastic material between said flange and said cross bearer.

13. A fastening arrangement for fastening a bumper on an end of a body at a substructure of a motor vehicle, said bumper including a bumper part to be fastened at a cross bearer connected with each of two vehicle longitudinal bearers, said bumper part including free ends extending into the respective longitudinal bearers, characterized in that the free ends of the bumper part are supported at a frame connection formed by the cross bearer and longitudinal bearers, said free ends of the bumper part are detachably connected to a support means attached to said longitudinal bearers, said support means serving as a support for the free ends of said bumper part and having a threaded bushing means operable to adjust a support height of the free ends of said bumper part.

14. A fastening arrangement for fastening a bumper on an end of a body at a substructure of a motor vehicle, said bumper including a bumper part to be fastened at a cross bearer connected with each of two vehicle longitudinal bearers, said bumper part including free ends extending into the respective longitudinal bearers, characterized in that the free ends of said bumper part are supported at a frame connection formed by the cross bearer and longitudinal bearers, means are provided for detachably connecting said free ends of the bumper part to a support means attached to said longitudinal bearers including a pivotal support member having a short support arm and a long support arm pivoted to each of the free ends of said bumper part, said short support arms and long support arms are capable of pointing substantially in an axial direction of the free ends of said bumper part during an insertion of the free ends into the longitudinal bearers, said long support arms are capable of being pivoted downwardly prior to a fastening of the pivotal support member at the support means, said short support arms are supported at said bumper part and said long support arms are connected to said support means.

15. A fastening arrangement according to claim 14, characterized in that said support member has fork-like shorter arms.

16. A fastening arrangement according to claim 14, characterized in that at least one of the support arms of said pivotal support member includes deflection edges which are deflected at coordinated guide surfaces on the inside of the longitudinal bearers during at least one of insertion and removal of the bumper part.

17. A fastening arrangement for fastening a bumper on an end of a body at a substructure of a motor vehicle, said bumper including a bumper part to be fastened at a cross bearer connected with each of two vehicle longitudinal bearers, said bumper part including free ends extending into the respective longitudinal bearers, characterized in that the free ends of said bumper part are supported at a frame connection formed by the cross bearer and longitudinal bearers, a sleeve means is operatively connected to said cross bearer for mounting of the free ends of said bumper part, said sleeve means having a bottom area provided with a through-opening permitting relative movement between said free ends and said bottom area, said bottom area, as well as a portion of said bumper part abutting thereagainst, are spherically shaped, and in that an external support of said bumper part also takes place at spherically curved areas of the cross bearer and at a flange connected to said bumper part.

18. A fastening arrangement according to claim 17, characterized in that said external support further includes a sleeve of elastic material interposed between said flange and said cross bearer.

* * * * *